United States Patent
Priest

[19]
[11] Patent Number: 6,141,032
[45] Date of Patent: Oct. 31, 2000

[54] METHOD AND APPARATUS FOR ENCODING, TRANSMITTING, STORING AND DECODING OF DATA

[76] Inventor: Madison E. Priest, 1719 President St., Palatka, Fla. 32177

[21] Appl. No.: 08/750,218
[22] PCT Filed: May 24, 1995
[86] PCT No.: PCT/US95/06423
  § 371 Date: Dec. 3, 1996
  § 102(e) Date: Dec. 3, 1996
[87] PCT Pub. No.: WO95/34167
  PCT Pub. Date: Dec. 14, 1995
[51] Int. Cl.[7] .................................................. H04N 7/14
[52] U.S. Cl. ........................................ 348/17; 379/93.08
[58] Field of Search ............................... 348/13–20, 22, 348/24, 724, 726–728; 379/93.08–93.09, 93.15, 93.17, 93.21, 93.28–93.34, 100.05, 100.13, 100.15, 372.22; 455/116, 108

[56] References Cited

U.S. PATENT DOCUMENTS

| | | |
|---|---|---|
| 2,580,903 | 1/1952 | Evans . |
| 3,263,027 | 7/1966 | Beltrami . |
| 3,873,771 | 3/1975 | Kleinerman et al. . |
| 4,237,555 | 12/1980 | Dishal ................................. 455/116 |
| 4,249,214 | 2/1981 | Boyd . |
| 4,263,617 | 4/1981 | Chemin et al. ...................... 348/724 |
| 4,328,579 | 5/1982 | Hashimoto et al. ................ 379/93.08 |
| 4,710,917 | 12/1987 | Tompkins et al. . |
| 4,849,811 | 7/1989 | Kleinerman ...................... 379/93.08 |
| 4,955,048 | 9/1990 | Iwamura et al. ...................... 348/17 |
| 5,164,980 | 11/1992 | Bush et al. ........................... 348/17 |
| 5,172,231 | 12/1992 | Jarick et al. . |
| 5,402,489 | 3/1995 | Gysel et al. . |
| 5,519,774 | 5/1996 | Battista et al. ...................... 379/372 |
| 5,627,581 | 5/1997 | Kondo .................................. 348/17 |
| 5,784,572 | 7/1998 | Rostoker et al. .................... 348/17 |

*Primary Examiner*—Curtis A. Kuntz
*Assistant Examiner*—George Eng
*Attorney, Agent, or Firm*—William M. Hobby, III

[57] ABSTRACT

The present invention relates to the transmission of information over a communication link (17), such as a telephone line, and to the encoding and decoding of data and to the storage of such encoded information. The system allows for transmission of real time video images over a twisted pair telephone line. The apparatus includes a data encoding circuit (11, 23) having a tone generator (24) for producing a fixed frequency tone within an audio frequency range and a harmonic generator (25) for phase modulating an input frequency. The composite signal is applied to a communication link (17) where a remote decoder (18, 21, 32, 35, 36) has a phase detector circuit (18, 32) driving a voltage controlled frequency conversion circuit (21, 36) to decode the encoded data and reproduce the high frequency signals. The encoded data in a preferred embodiment is applied to the communication link (17) with a very low level signal having an amplitude of less than −32 dbm and can transmit video signals real time over existing telephone and communication lines. The encoded signals can be applied to a storage medium where they can be decoded at a later time with the decoder circuit (18, 21, 32, 35, 36) for playing on a video monitor. The stored or transmitted signals allow large amounts of data to be stored or transmitted through a narrow frequency band of less than 100 Hz, so that a large number of separate bands can be simultaneously transmitted over the same communication link (17).

63 Claims, 4 Drawing Sheets

METHOD AND APPARATUS FOR ENCODING, TRANSMITTING, STORING AND DECODING OF DATA

BACKGROUND OF THE INVENTION

The present invention relates to the transmission of information over a communication link, such as a telephone line, and to the encoding and decoding of data and to the storage of such encoded information. This application is a continuation in part of U.S. patent application Ser. No. 08/254,164, filed Jun. 6, 1994 for PROCESS AND APPARATUS FOR TRANSMITTING VIDEO SIGNALS OVER A COMMUNICATION LINK.

Common or ordinary voice grade telephone lines have been utilized for a number of years in connection with the transmission and reception of signals, other than audio signals. Common or ordinary voice grade telephone lines are telephone lines that have substantially the same predetermined or standard bandwidth, i.e. about 0–3600 Hz, that make up the substantial majority of telephone lines in the United States, as well as in foreign countries, for providing the telephone linkage among residences, public telephones and most businesses. Ordinary telephone lines have also been used to transmit video signals. The ordinary telephone line, having a bandwidth of about 0–3600 Hz or a transmission rate of about 9.6 kbaud, does not transmit, in real time, a typical full motion commercial television type black and white and/or color video image. The commercial television system displays 512×512 pixel images at 30 frames per second and uses about 6 MHz bandwidth while simultaneously transmitting video and audio signals. Because of the large bandwidth required, prior art systems do not enable one to transmit full motion images over an ordinary voice grade telephone line. In connection with the transmission of video and audio signals, the video signal is transmitted over the ordinary telephone line using a first, predetermined bandwidth of the limited bandwidth of the ordinary telephone line and the audio signal is transmitted using a second, predetermined bandwidth of the limited bandwidth of the ordinary telephone line. U.S. Pat. No. 4,849,811 to Kleinerman, issued Jul. 18, 1989, and entitled "Simultaneous Audio and Video Transmission with Restricted Bandwidth" describes a system in which modulated digitized image signals and filtered voice signals are transmitted together over an ordinary telephone line whereby still or freeze-frame images are provided with accompanying video. The digitized image signals are in the range of 2400 to less than about 400 Hz. A low pass filter limits the voice signals to a range outside the digitized image signals so that the image signals and voice signals can be transmitted at the same time but over separated sections of the limited bandwidth of the telephone line. Because of the separate bandwidths used, means must be provided for synchronizing the sending and/or receiving of the video and audio signals at the received end. In conjunction with the more rapid transmission of video images, the use of known data compression techniques is mentioned in this patent. Similarly, in U.S. Pat. No. 3,873,771 to Kleinerman, issued Mar. 25, 1975, and entitled "Simultaneous Transmission of a Video and an Audio Signal Through an Ordinary Telephone Transmission Line", a communication system is disclosed for transmitting video and audio information using separate bandwidths of the limited bandwidth of an ordinary telephone line. With regard to the transmission of video information, it is accomplished using slow scan TV techniques so that an image is not transmitted in real time, but rather the transmission requires up to about 8 seconds to transmit an image with 120 scan lines per image.

In another technique for transmitting video and audio signals, two signals are multiplexed in such a way to enable one of the two signals to be sent when the other of the two signals is not being transmitted.

These prior art systems are not capable of transmitting, in real time, the audio and the moving video image data together over an ordinary voice grade telephone line. Such prior systems require from about 3–60 seconds to transmit a still image. This occurs because voice grade telephone lines typically have a bandwidth of only about 0–3600 Hz. Because of this limited bandwidth, the amount of data or information that can be transmitted in a given time is limited. To overcome this drawback, it is known to use transmission lines, other than ordinary telephone lines, for transmitting voice and video data. In such systems, transmission lines are used having a significantly greater bandwidth than that of ordinary telephone lines, such as fiber optic lines. With regard to fiber optic transmission lines or other transmission lines having a much greater bandwidth than the ordinary telephone line, it is known to transmit video and audio signals in real time.

Simultaneous transmission of three television signals is disclosed in U.S. Pat. No. 4,593,318 to Eng et al., issued Jun. 3, 1986 and entitled "Technique for the Time Compression Multiplexing of Three Television Signals". In one embodiment of the system, a time compression multiplexing technique enables the transmission of three color television signals through a satellite transponder having a 36 MHz bandwidth in which one field signal and two field differential signals are each time compressed to permit all three signals to be sent in the period of a normal field signal of a standard TV signal. Since there are three TV sources, with each producing stereo audio, six audio signals are also transmitted. The stereo audio from each source is sent along with the video by inserting digital audio in either the vertical or horizontal blanking periods associated with the video.

In addition to providing an increased bandwidth in order to transmit a plurality of signals including video and audio signals, as some of the prior art indicates, data compression techniques are employed so that compressed video information can be transmitted for subsequent expansion at a receiver station, without meaningful loss of transmitted information. Various compression methods have been suggested for transmitting video image data over a digital telephone line. To achieve the compression, spectral, spatial and temporal compression techniques are employed. These data compression techniques are utilized in such a way to exploit the human eye's forgiving nature so as to make the tradeoffs that cause the least objectionable losses in picture quality. In connection with the compression, comparisons are made between new pixel information and previously transmitted pixel information so that only video information that is changing need be sent.

Other U.S. patents that use telephone lines for the transmission of video data can be seen in U.S. Pat. No. 5,164,980 for a video telephone and in U.S. Pat. No. 5,202,951 for a Full Motion Video Telephone System. U.S. Pat. No. 3,702,899 for a Digital Video Transmitter uses a conventional telephone system. U.S. Pat. No. 3,974,329 is for the Transmission of Video Pictures at audio frequencies. Two U.S. patents to Yurt et al. U.S. Pat. No. 5,253,275 and U.S. Pat. No. 5,132,992 each teach an audio and video transmission and receiving system. U.S. Pat. No. 4,620,217 for a standard transmission and recording of high resolution television separates the modulation frequency as sidebands with pixel information out from the video signal from the television camera. A heterodyne converter is used to convert the sidebands down to a color subcarrier band.

The Gitlin et al patent, U.S. Pat. No. 4,924,492, is for a method and apparatus for wide band transmission of digital signals between, for example, a telephone central office and customer premises and uses a telephone local loop transmission arrangement in which data is communicated from the customer's premises to a central office utilizing a multi-dimensional pass-band signal. In the U.K. patent application, GB 2,173,675A, a communication system for sending video and audio signals to a telephone line supplies a digitized video signal from a camera and uses an analog-to-digital converter along with a frame storage and a parallel-to-series converter. The signal bytes from the converter and sync signals from a timing generator are supplied to a frequency shift keyer to produce an output signal at any one of several distinct frequencies within the audio frequency band of the telephone line.

In summary, many systems have been proposed or devised for transmitting video information and/or audio information over telephone lines but none has been provided that relatively inexpensively sends and receives, in substantially real time, both video information and audio information over an ordinary voice grade telephone line. It would be advantageous to have such a system in order to provide real time viewing.

In contrast to the prior art, the present invention allows the transmission of real time video signals over twisted pair copper telephone lines in which monochrome composite color signals are phase modulated relative to a fixed frequency reference tone in the audio frequency range to form a narrow passband, such as 100 Hz. The phase modulated signals are phase detected between the reference tone and the modulated video signal tones and have been converted to a constantly varying phase modulated signal in an audio frequency spaced from the reference tone by a small DC voltage, i.e. about 0.17 volts. The system is relatively inexpensive and sends and receives, in real time, both video information and audio information over ordinary voice grade twisted pair telephone lines and is transmitted through all types of lines including fiber optic lines and through electrical switches and repeaters. The present invention is further directed to increasing the rate at which data can pass through a transmission medium so as to increase the distance over which high bandwidth signals can be transmitted in a low bandwidth medium. This increase of the apparent bandwidths of a transmission medium include low bandwidth telephone lines and cable as well as fiber optic lines and broadcast over the airwaves as well as a communication satellite link. In one specific embodiment of the invention, monochrome or RGB color signals are transmitted over a low bandwidth telephone line or other communication link over substantial distances with a minimum degradation thereof. The transmission of the video signals can be over conventional telephone lines through an existing telephone system including an international communication link over large distances, such as several thousand miles, with no modification of the telephone system or line and with only partial degradation of the picture quality. In addition, the video signals can be passed through the conventional switching equipment of telephone exchanges and through the conventional repeaters used in telephone lines without rejection as high frequency noise. The present invention also provides an improved encoder and decoder for the transmission of stored information including a variable reference line for referencing phase modulated data which is phase detected through operational amplifiers or the like to provide a high sensitivity to the predetermined frequency and which detectors can operate to drive a voltage controlled frequency converter circuit to produce frequency input to the encoder. Another improvement in the present invention includes the transmission of high bandwidth signals over a long distance in a low bandwidth transmission medium utilizing a very low signal level in an area below the level of the telephone filters that reduce noise on the telephone line. It is also a purpose of the present invention to be able to use the encoded data placed directly on a storage medium, such as an optical disc storage or magnetic storage, such that large amounts of data are stored on the storage medium in the encoded format which can be decoded by a decoder.

It will be understood by those skilled in the art that a communication link or data channel is a path for transmission between two or more stations or terminals and it can be a single pair of wires or a group of wires in a cable, a coaxial cable, or a fiber optic cable, or a special band of the RF spectrum. The system advantageously can be used interactively in real time. Digital data is generally used in place of analog information in electronic and computer applications so that data communications is the electronic transmission of encoded information or data from one point to another. The present invention utilizes phase modulation. Phase modulation is the phase of the carrier wave is varied by an amount proportional to the amplitude of the message signal. In phase modulation, the instantaneous phase of the carrier is shifted in accordance with the modulating waveform. The extent of the phase shift is directly proportional to the amplitude of the modulated signal. The rapidity of the phase shift is directly proportional to the change in the amplitude and frequency of the modulating signal.

SUMMARY OF THE INVENTION

The present invention relates to the transmission of information over a communication link, such as a telephone line, and to the storage of such information and to a system for transmitting real time video images over a twisted pair telephone line or communication link of any kind. The apparatus includes a data encoding circuit having a tone generator for producing a fixed frequency tone within an audio frequency band and a harmonic generator for phase modulating an audio frequency that is spaced in amplitude from the reference tone. The composite signal thus generated is applied to a communication link where a remote decoder has a phase detector circuit driving a voltage controlled frequency conversion circuit to decode the data from the audio frequency and reproduce the original high frequency signals. The encoded data in a preferred embodiment is applied to the communication link with a very low level signal having an amplitude of less than −32 dbm (relative to 1 mw) and can transmit video signals real time over existing telephone lines and over any communication link. The method of the present invention includes generating a low frequency reference signal and a low frequency modulated data signal from a modulated high frequency data signal, which signals are superimposed one over the other, and then combining the signals for the transmission over a communication link at a very low level, such as between −40 and −60 dbm and in a frequency range between 10 and 3600 Hz. The process also includes phase detecting the combined signals at a remote receiving station to drive a voltage controlled frequency conversion circuit to thereby produce an output of high frequency modulated data from the transmitted data signals received over a communication link. The encoded signals can be applied to a storage medium where they can be decoded at a later time with a decoder circuit, for example, playing on a video monitor. The transmitted or stored signals are in effect compressed and allow large amounts of data to be transmitted through a narrow audio frequency band, such as less than 100 Hz so that a large number of separate bands can be simultaneously transmitted over the same communication link.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
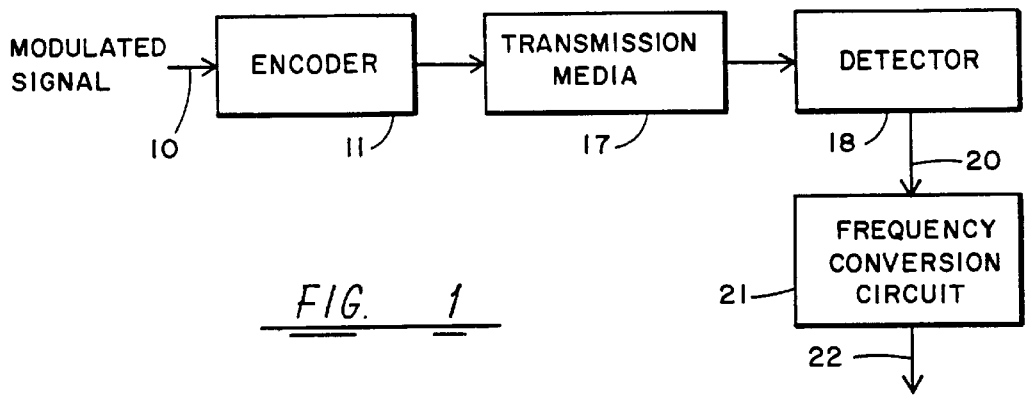
FIG. 1 is a block diagram of a basic system for encoding, transmission, and decoding data in accordance with the present invention.
Figure 2:
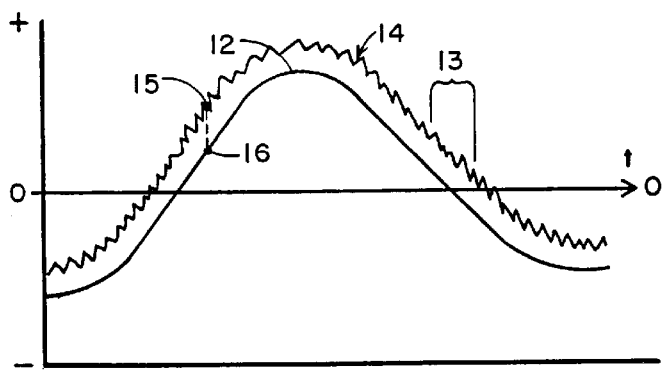
FIG. 2 is a waveform diagram.

Referring to FIGS. 1 and 2, a basic embodiment of the invention is illustrated in the block diagram of FIG. 1 with the input waveform illustrated in FIG. 2. In operation, a data signal, which is an intelligence carrying signal, and which may, for instance, be a television or video composite signal, is input at 10 into an encoder 11. The encoder is a reference tone generator and encoder which produces from the modulated signal 10 a composite signal from a fixed frequency reference signal 12 and a modulated data signal 13 shown superimposed on the fixed frequency tone 12 to form a composite signal. The signals 14 and 12, shown relative to each other in FIG. 2, are combined to form a composite signal for transmission. The composite signals are thus the combined fixed frequency reference signals 12 and the continuously phase modulated data signal 13. The fixed frequency signal 12 acts as a reference signal relative to the modulated signal 13 much as a conventional signal will be referenced to a zero voltage line. The modulated data signal 13 thereby, at any instance, has a phase relationship between the modulated portion of the signal 13 at any one point, such as 15, relative to the adjacent point 16 on the fixed frequency tone but the phase relationship is constantly changing as the signal 13 is modulated. The composite of the signals is transmitted over a communications link 17, which can be an ordinary twisted pair telephone line, but can also be any other communications link desired.

The signal being transmitted over the communication link 17 is detected by a phase detector circuit 18 at a remote location. The phase detector in this case may be an operational amplifier (or OP amp) which receives the composite signal and, by constantly reading the phase difference between the composite signal components 12 and 13, produces an output of a continuously varying DC voltage signal in the output line 20, which corresponds to the modulated signal of the input 10. The constantly varying DC voltage signal 20 is applied to a voltage controlled frequency conversion circuit 21 which, for instance, may be a voltage controlled oscillator, so that each voltage level being impinged upon the circuit 21 produces a predetermined output frequency in the output 22 which is identical to the modulated signal of the input 10 at the remote encoder. The frequency conversion circuit 21 can be any voltage controlled frequency conversion circuit desired and utilizes commercially available integrated circuits. The phase detector can be any commercially available OP amp but it is desirable to have a more sensitive amplifier for detecting very low amplitude signals 14. The operational amplifier is also set to detect only signals within a narrow frequency range encompassing the composite signal. The detector is strapped by a resistor value to a specific reference tone so that it is looking to the specific transmitted reference tone. This rejects noise or other interferences with the signal from being transmitted. The encoder 11, which produces this signal, includes a tone generator which accurately produces the stable fixed frequency signal tone 12. The encoder 11 circuit can also take a higher frequency, such as a video signal input, and convert it to a phase modulated signal 13 spaced by a predetermined, but small, level from the reference signal 12. The voltage difference between the signals can, for instance, be offset by about 0.17 volt. The fixed frequency signal 12 can be an audio frequency within the range 10 to 3600 Hz so that the signal can be transmitted through a twisted pair telephone line 17. It has been found that the circuit 11 can use a commonly available integrated circuit chip, such as a phasing chip, when modified with a feedback loop which makes the reference tone 12 fixed at a very stable frequency and which eliminates reference tone harmonics being created by the circuit.

The composite signal can be applied to a communication link 17 in which the communication link includes a twisted pair telephone line. Thus, large amounts of information can be transmitted when the level of the tone signal 12 is very low, such as below −32 dbm (relative to 1 mw). The encoder reduces the signal level with a resistor value set to a level below −32 dbm. Current work indicates that an optimum signal level for use on telephone lines is between −40 and −60 dbm. However, the optimum level range results from the fact that signals above −40 dbm are filtered out on telephone lines and because the equipment rises rapidly in cost and complexity below −60 dbm. However, it has been shown that the signal can be transmitted below −60 dbm and theoretically can be transmitted well below this level.

As can be seen from the basic circuit, the transmitting of large amounts of information in the composite signal 14 uses a very small bandwidth on the order of 100 Hz. The fixed frequency reference tone 12 for use on a telephone line is chosen between 40 and 3600 Hz of the audio range and with an amplitude of less than 200 millivolts and thus can transmit a very large amount of information to a remote source. The signals at this low level have been found to pass through telephone lines of all types, twisted pair and fiber optics as well as through the phone company switches and repeaters and through cellular phone connections.

Figure 3:
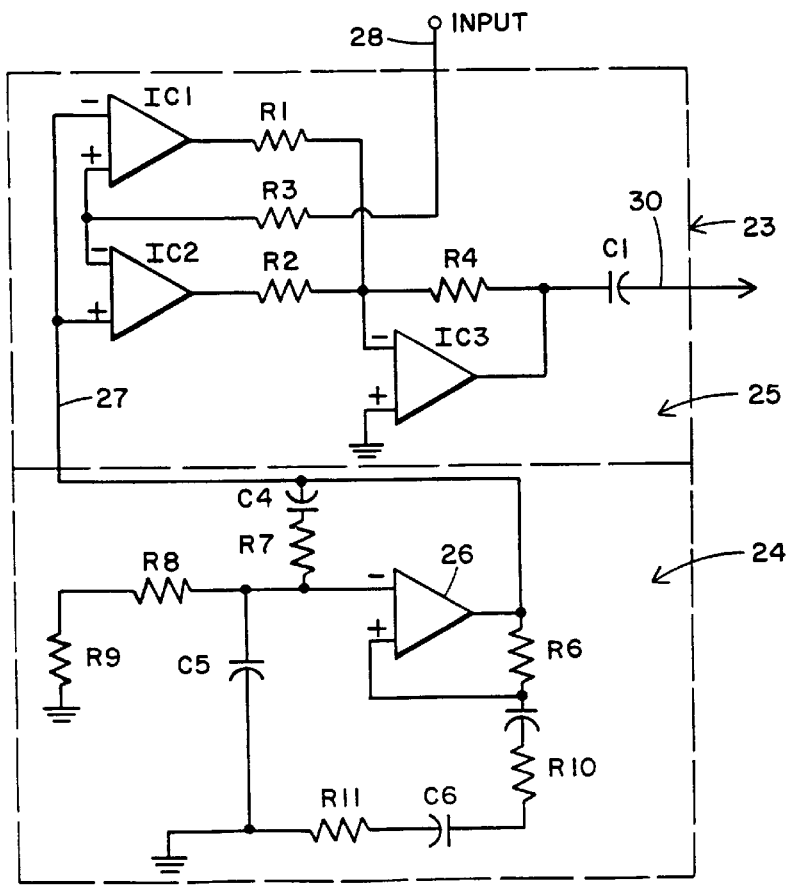
FIG. 3 is a schematic diagram of a preferred embodiment of the encoding circuitry of the present invention.
Figure 4:
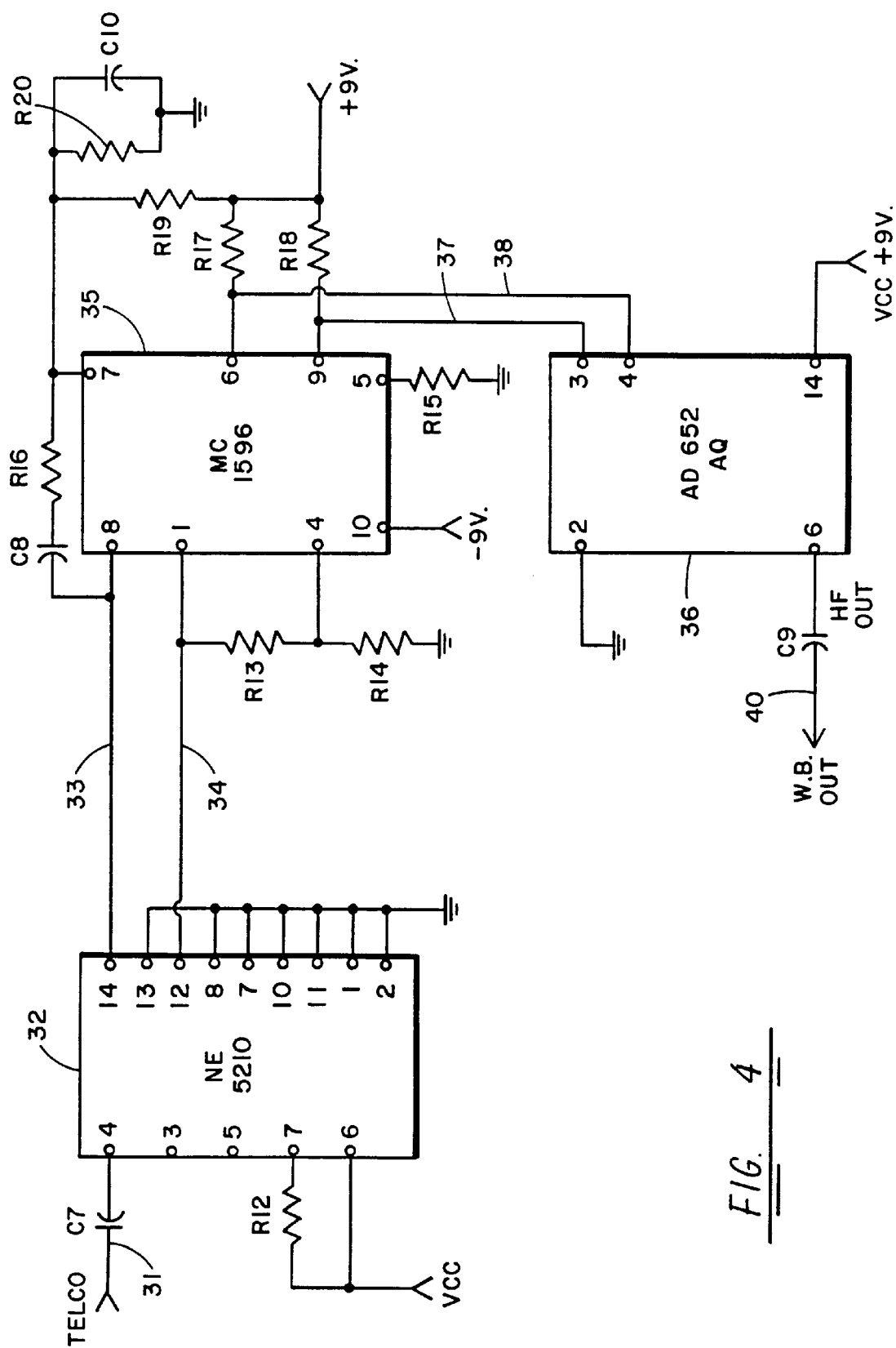
FIG. 4 is a schematic diagram of a preferred embodiment of the decoding circuitry of the present invention.

Turning to FIGS. 3 and 4, a schematic diagram of a circuit in accordance with the present invention is shown.

In FIG. 3, an encoder circuit 23 in accordance with the present invention includes a reference tone generator 24 and a frequency multiplier or harmonic generator 25. The reference tone generator is wired around an amplifier 26 having a feedback loop to produce the reference tone 12 in its output line 27. Reference tone 12, as shown in FIG. 2, may be a fixed frequency sine wave in the audio range between 40 and 3600 Hz but will work at higher frequencies on a transmission media, such as fiber optic lines. A tone generator 24 puts out a different frequency reference tone for each transmission band. The harmonic generator 25 is illustrated using three gating amplifiers IC1, IC2, IC3 and has an input 28 for feeding a high frequency input, such as a composite video signal, or the like thereinto. The reference tone on the line 27 from the reference tone generator is applied at the opposite input to IC1 and IC2 from the input 28. The harmonic generator 25 is keyed to phase modulate the high frequency input at 28 to produce a phase modulating signal 13, as shown in FIG. 2. The phase modulating signal 13 as illustrated is produced as a modulated signal tracking a sine wave which is slightly biased above the reference tone 12. The bias between the reference tone 12 and the modulating frequency 13 may be about 0.17 volt between the fixed frequency 12 and the average of the modulating sine wave 14 between points 15 and 16 or, in any event, the bias is set for less than 0.2 volts. The circuit 23 has an output 30 which has combined the fixed frequency tone 12 and the modulating signal 14 into a composite signal, which composite signal is being outputted on the line 30 for transmission on a communication link or for storage for later transmission or playback as desired. In transmission over a communication link, the composite data signal at the output 30 is at a level of less than −32 dbm and preferably in a range between −40 and −60 dbm. Signals at this level would normally be considered in the noise level but have been found, when modulated in this manner, to pass through twisted pair copper telephone lines without stripping the modulated signal portion 14 from the composite signal.

The circuit components values in FIG. 3 are as follows:

$R1 = 10 \text{ k}\Omega$ $R2 = 10 \text{ k}\Omega$ $R3 = 1.5 \text{ meg}\Omega$ $R4 = 10 \text{ meg}\Omega$ $R6 = 20 \text{ k}\Omega$ $R7 = 510 \text{ k}\Omega$ $R8 = 3.3 \text{ meg}$ $R9 = 3.3 \text{ m}\Omega$ $R10 = 7.5 \text{ k}$ $R11 = 5.6 \text{ k or}$ $C1 = .47 \mu f, 100 \text{ v}$ $C4 = 100 \mu f$ $C5 = 100 \mu f$ $C6 = 6.2 \mu f$ Referring to FIG. 4, the output 30 from the circuit of FIG. 3 is received on the incoming telephone line 31 of the decoding circuit of FIG. 4 where it is applied to a phase detector circuit 32 having an IC chip NE5210 wired as a phase detector when received from the communication link 31 through the capacitor C7. The integrated circuit 5210 is a circuit formed of a plurality of operational amplifiers wired to provide a narrow bandwidth for the received phase modulated signal on the line 31. Alternatively, a single operational amplifier can also be wired to detect the phase modulation by separating the tone reference 12 of FIG. 2 and the phase modulated signal 13, which has been combined in the composite signal. The circuit 32 provides a stable and very sensitive phase detector.

The output from the integrated circuit 32, through the lines 33 and 34, are applied to a DC stabilizer circuit 35, using either a MC1596 or an MC1496 IC. This circuit is a monolithic transistor array arranged as a balanced modulator/demodulator and generally is selected because of the excellent matching qualities of monolithic devices to provide a superior carrier and signal rejection. The versatility of the balanced modulator chip of this type allows the device to be used as a phase detector or as a DC stabilizer to further enhance the signal from the phase detector 32. The two signals on the lines 33 and 34 can be DC signals analogous to the signals 14 of FIG. 2 so that the different components become stabilized time varying DC and any undesired sum components are filtered out. The output DC component is related to the phase angle and provides an improved linearity of the converted signals while at the same time providing a conversion gain for greater resolution.

The output from the circuit 35 is applied to the IC chip 36, an AD652 AQ chip, which is a voltage controlled frequency conversion circuit which converts DC inputs on lines 37 and 38 into a continuously varying high frequency at the output 40. This frequency output should be the same as the high frequency input 28 from FIG. 3 and is a wide band high frequency output. The frequency conversion circuit 36 could be a voltage controlled oscillator chip which continuously converts the DC voltage input on the lines 37 and 38 to a continuously changing frequency analogous to the DC voltage input.

It has been found that when the encoder of FIG. 3 puts out a composite signal from the component signals of FIG. 2, with a very low amplitude of below −32 db, the signals can be transmitted through twisted pair copper telephone wires as well as other telephone lines and transmission media carrying information from the input high frequency signals in the input 28. The transmitted signals can be detected and can produce a color or monochrome video signal at the output 40 which can operate a monitor in real time from the input signal 28. The decoder circuit of FIG. 4 is able to detect and reproduce the signal transmitted over such a communication link at great distances without any significant loss of signal, with the signal transmitted in an audio frequency band of between 40 and 3600 Hz, and with a plurality of signals transmitted in an audio bandwidth of 100 Hz or less. The signal can also be transmitted over a higher frequency, above 3600 Hz, where there is not a twisted pair telephone line in the communication link. Thus, a large number of video signals can be transmitted simultaneously over a single twisted pair copper telephone line and can transmit such video signals through multiple transmission media, such as fiber optic lines, telephone company switching stations, and various types of high speed switches as well as through telephone line repeaters incorporated into the telephone lines without any reduction in the signal. Raising the signal output at the output 30 of FIG. 2 above −32 dbm presently results in the telephone company filters filtering out the modulated signals. Also, raising the signal level above this point substantially reduces the transmission efficiency.

The circuit component valves in FIG. 4 are as follows:

$R12 = 5.6 \text{ k}\Omega$ $R13 = 51 \Omega$ $R14 = 51 \Omega$ $R15 = 5.6 \text{ k}\Omega$ $R16 = 5.1 \text{ meg}\Omega$ -continued R17 = 3.9 kΩ

R18 = 3.9 kΩ

R19 = 1 kΩ

R20 = 1 kΩ

C7 = 1.4μf

C8 = .1μf

C9 = .47μf

C10 = .1μf

Figure 5:
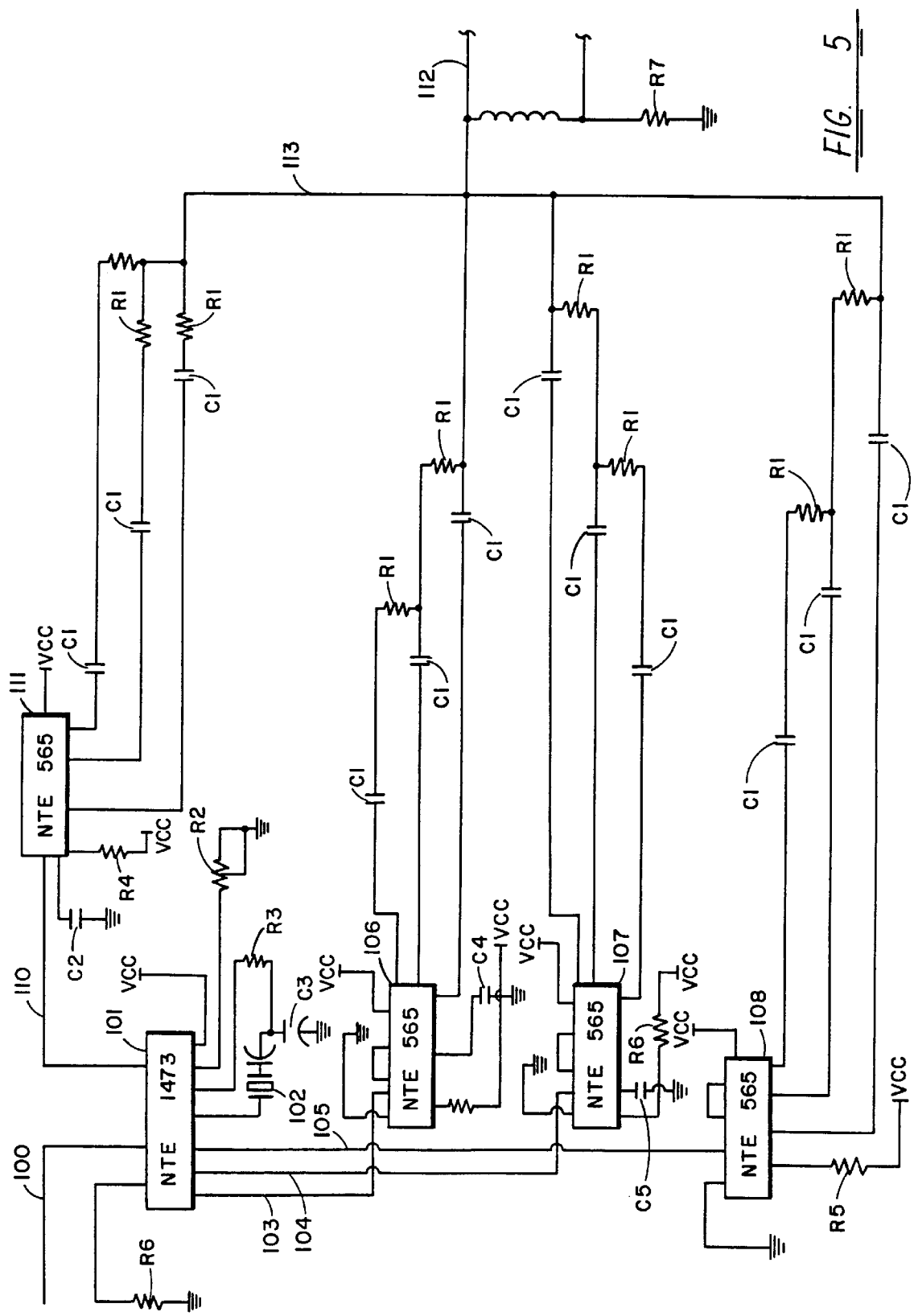
FIG. 5 is a schematic diagram of a transmission circuit for transmitting video signals over a telephone line.

FIG. 5 shows a schematic diagram of the present invention using commercially available integrated circuits in an embodiment of the encoding and reference tone generation circuitry. A composite video signal is received on line 100 which signal may be generated by a video camera, video tape, or from disc storage or the like. The signals are applied to the video jungle circuit 101 which provides separation of the signals into separate R, G, and B signals. The video jungle integrated circuit (NTE 1473) contains a self-regulating power supply and the ability to process composite video into the separate red, green, and blue signals, and the ability to supply lumina and sync, and is crystal controlled. The circuit is commercially used in many television receivers. A quartz crystal element 102 controls a clock circuit for applying a signal to the video jungle circuit 101. The signal output from the video jungle circuit 27 includes RGB signals applied to lines 103, 104, and 105 which in turn apply the respective signals to the encoder and reference tone generator circuits 106, 107, and 108. A lumina output signal on the line 110 is applied to an encoder and reference tone generator 111 for producing a composite signal having a fixed frequency modulated reference tone and a spaced phase modulation data signal. Each of the encoders and reference tone generators produce a low frequency reference tone in the audio frequency range between 40 and 3600 Hz in which each reference tone can typically be separated by 100 Hz. Each reference tone is either one of the RGB signals or the lumina signal encoded in a phase modulated synchronization signal in a low frequency stream over one reference tone as seen in the waveform of FIG. 2. Each of the reference tones from the encoder and tone generators 106, 107, and 108 produces a composite output signal with continuously varying phase difference between the video signal portions from the video jungle circuit and the fixed frequency modulated reference signal. The composite signal for the signals is a phase differential signal used in transmitting the signal over a telephone line 112. The phase difference signal of the lumina signal is applied to line 113. The circuit component values in FIG. 5 are as follows:

R1 = 10Ω

R2 = 1 kΩ

R3 = 470Ω

R4 = 560Ω

R5 = 270Ω

R6 = 56 kΩ

R7 = 1 k

-continued

C1 = .33μf

C2 = .0082μf

C3 = 30μμf

C4 = 100μf

C5 = .0082μf

Figure 6:
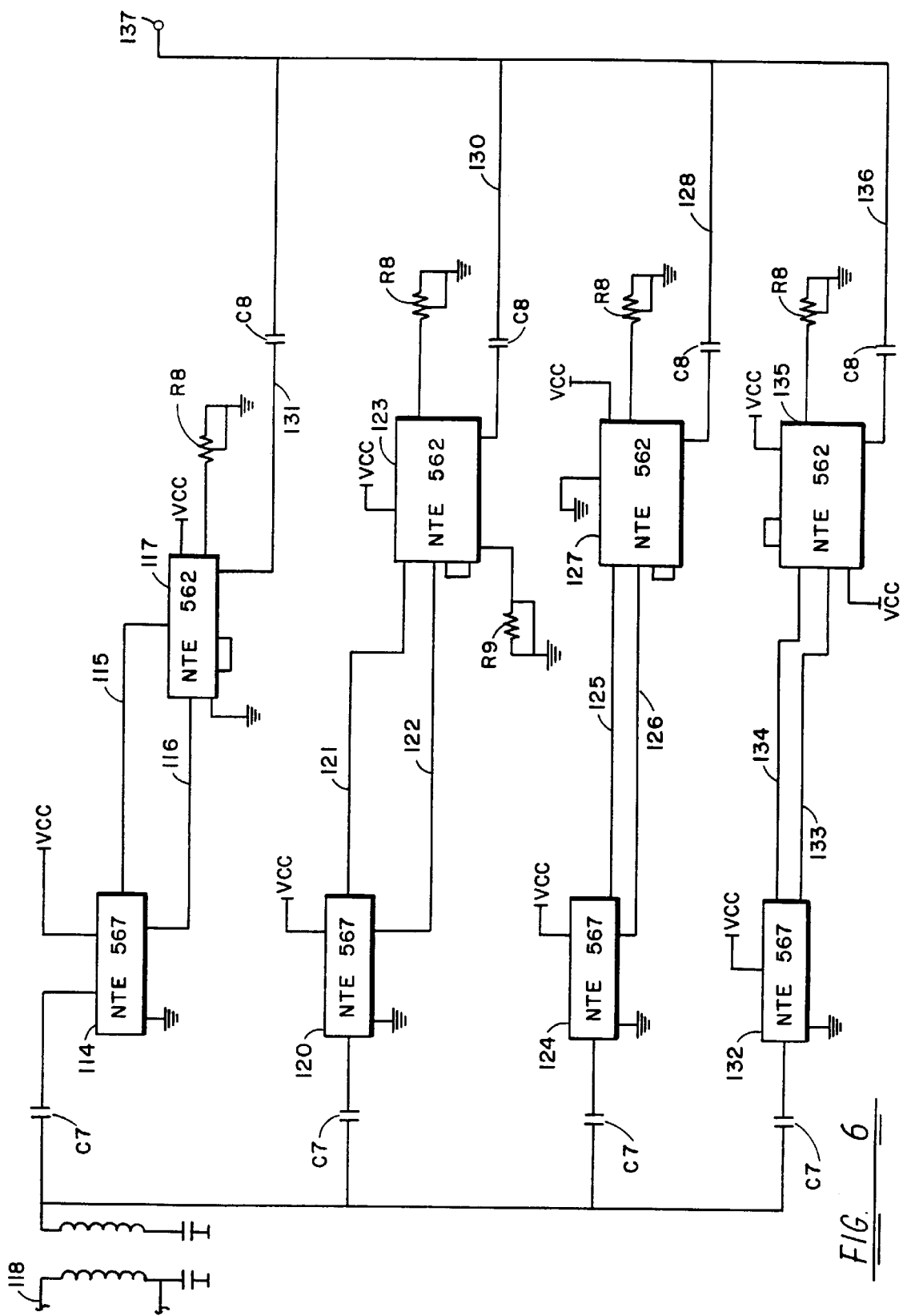
FIG. 6 is a schematic diagram of the receiving circuitry for receiving and decoding transmitted video signals transmitted over a telephone line.

The signals from this circuit are applied over the telephone line 112 to the receiving circuit in FIG. 6 where the signals are first received by a series of detectors which may operational amplifier integrated circuit 114 which produces the phase detected signals on the lines 115 and 116 to a voltage controlled oscillator or VCO circuit 117. The signals are also applied from the input line 118 to a circuit 120 which detects the phase shift in the signals between the data carrying signals and the fixed frequency reference tone and produces a varying DC signal output. The detector circuit 120, which is also an OP amp is limited to a narrow bandwidth to generate a frequency and amplitude signal which is then applied over the circuit lines 121 and 122 to a VCO 123. A third signal component received over a telephone line 118 is applied to a third detector or operational amplifier 124 which generates a varying DC output on the circuit lines 125 and 126 to the VCO 127 which generates a continuously varying frequency responsive to the varying DC voltage applied thereto on the output line 128. The output from the VCO 123 is on the line 130 while the output from the VCO 117 is applied to the line 131. In addition, signal components from the telephone line 118 are applied to the detector operational amplifier circuit 132 which applies its output signal to the circuit conductors 133 and 134. The signals are applied to a VCO 135 which has an output onto line 136. A composite of all the outputs is applied as a composite video signal at 137 where it may be applied to a video monitor, producing a composite high resolution television signal, with scan lines in accordance with the National Television Systems Committee (NTSC) standards for television transmission, and which may also be detected by a monochrome receiver to display the image in black and white. The signals, of course, can be transmitted in accordance with other standards, such as PAL or SEACAM. The circuit component values in FIG. 6 are as follows:

R8 = 1 kΩ

R9 = 1 kΩ

C7 = .33μf (kov)

C8 = .082μf

It should be clear at this point that the process and circuity for the transmission of video signals over a communication link, such as a telephone line, have been provided. The process includes the step of generating a composite video signal for transmission to a remote point, such as with a video camera or the like, changing the composite video signal frequency to a lower frequency applied to and spaced apart from an audio reference signal. The composite video IC signal is separated into a plurality of component signals in the embodiment of FIGS. 5 and 6. A plurality of separate audio reference tones are generated in the audio range, each being slightly different in frequency from each other, such as by 100 Hz, with each reference tone having one component of the separate composite video signal applied thereto. The measured phase differences between each component video signal and the reference tone is transmitted in a composite signal.

The method includes the receiving of the transmitted composite audio reference tone and separated audio/video signals at a remote location and then reconstituting the composite video signals to produce a video signal transmitted in real time over a telephone communication link including an ordinary twisted wire telephone line. The composite signal is applied to the telephone line at a very low amplitude, such as below −32 dbm and preferably in the range of between −40 and −60 dbm.

It should be clear at this time that both a method and circuit have been provided for encoding, transmitting, storing and decoding information in signals, and can transmit video signals over voice grade telephone lines, as well as large amounts of analog and digital data. The signals transmit equally well over other telephone lines, including a typical mix of twisted wire and fiber optic cable and through the line switches and repeaters without loss of signals. The signals can also be stored by later decoding and in this connection allow the storage of large volumes of data in a limited space. However, the present invention is not to be considered limited to transmissions over telephone lines since the signal can be stored in disc or magnetic memory which then in effect becomes a very compressed form of storage. The signals can also be transmitted over a satellite link and digital data as well as analog have been found to transmit over the communications link. Accordingly, the forms shown are to be considered illustrative rather than restrictive.

I claim:

1. A method of encoding data for transmission or storage comprising the steps of:
   generating a fixed frequency reference signal;
   generating a modulated data signal;
   superimposing said modulated data signal over said fixed frequency reference signal to form a composite signal; and
   outputting said composite signal with an amplitude level of less than −32 dbm, whereby information is encoded into a composite signal which can be stored or transmitted over a communications link (17).

2. A method of encoding data for transmission or storage in accordance with claim 1 in which the step of generating a modulated data signal includes generating said modulated data signal with a DC offset of less than 0.2 volt between said modulated data signal and said fixed frequency reference signal.

3. A method of encoding data for transmission or storage in accordance with claim 1 in which the step of generating a fixed frequency reference signal includes generating an audio reference signal between 40 and 3600 Hz.

4. A method of encoding data for transmission or storage in accordance with claim 3 in which the step of generating a modulated data signal includes generating a modulated data signal of high frequency analog signals above 1 megahertz superimposed over said audio reference signal to form a composite signal.

5. A method of encoding data in accordance with claim 1 including the step of applying said composite signal onto a storage medium.

6. A method of encoding data in accordance with claim 4 in which the step of generating a modulated data signal includes generating a video modulated data signal of high frequency analog signals superimposed on said audio reference signal.

7. A method in accordance with claim 1 including the step of applying said composite signal onto a communication link (17) with a signal level of less than −32 dbm.

8. A method in accordance with claim 7 including the step of applying said composite signal onto a communication link (17) with a signal level of between −40 and −60 dbm.

9. A method in accordance with claim 7 in which the step of applying said composite signal onto a communication link (17) includes applying said composite signal onto a twisted pair telephone line cable.

10. A method in accordance with claim 7 in which the step of applying said composite signal onto a communication link (17) includes applying said composite signal onto a communication link which includes a satellite telecommunication link.

11. A method in accordance with claim 7 in which the step of applying said composite signal onto a communication link includes applying said composite signal onto a communication link (17) of an internationally connected telecommunication network.

12. A method in accordance with claim 7 in which the step of applying said composite signal onto a communication link (17) includes applying said composite signal onto a communication link having a plurality of electronic switches therein for directing said transmitted signals.

13. A method in accordance with claim 1 in which the steps of generating a fixed frequency reference signal includes generating a plurality of fixed audio frequency reference signals and the step of generating a modulated data signal includes generating a plurality of high frequency modulating data signals and the step of superimposing said modulated data signal includes superimposing each of said generated modulated high frequency data signals onto one of said plurality of fixed audio reference signals.

14. A method in accordance with claim 13 in which the step of generating a plurality of fixed frequency reference signals includes generating a plurality of fixed frequency modulated reference signals each having a frequency of between 40 and 3600 Hz.

15. A method in accordance with claim 14 in which the step of generating a plurality of fixed frequency reference signals includes generating a plurality of fixed frequency reference signals each having a frequency spacing from the next closest signal of between 1 and 100 Hz.

16. A method in accordance with claim 1 in which the step of generating a fixed frequency reference signal includes generating a fixed frequency reference signal having a fixed frequency selected from between 40 and 3600 Hz and the step of generating a modulated data signal includes generating said modulated data signal with a DC offset of less than 0.2 volt between said modulated data signal and said fixed frequency reference signal.

17. A method in accordance with claim 1 including the steps of:
   applying said composite signal onto a phase detecting circuit (18, 32);
   fixed frequency said reference signal and modulating data signal in said detecting circuit; and
   applying said detected signals from said detecting circuit to a voltage controlled frequency conversion circuit to produce an output of modulated data signals whereby encoded data is decoded.

18. A method in accordance with claim 17 in which the step of detecting said composite signal includes selecting a detector circuit (18, 32) tuned to a narrow bandwidth covering the bandwidth of said fixed frequency reference signal therein, whereby noise and signals outside of the tuned bandwidth are excluded from detection.

19. A method in accordance with claim 18 in which said step of detecting said composite signal includes detecting the phase of said modulated data signal with a phase detector circuit (18, 32).

20. A method in accordance with claim 7 in which the step of detecting the phase of said modulated data signal includes applying said composite signal to an OP amp to produce a varying DC output therefrom.

21. A method in accordance with claim 17 in which the step of applying said detected signals from said phase detecting circuit (18, 32) to a voltage controlled frequency conversion circuit (21) includes applying said detected signals to a voltage controlled oscillator.

22. A method of transmitting data over a transmission link (17) comprising the steps of:
   encoding data into a modulated data signal and superimposing said modulated data signal over a reference signal to produce a composite data carrying signal;
   applying said composite data signal onto a transmission link (17) with a signal level less than −32 dbm;
   receiving said composite data signal at a remote point on said transmission link (17);
   decoding said composite data signal with a phase detector circuit (18, 32) to generate a varying voltage signal; and
   driving a frequency conversion circuit (21, 36) with said decoded composite data signal to thereby reproduce said modulated data signal.

23. A method of transmitting data over a transmission link (17) in accordance with claim 22 in which said composite data signal has said modulating data signal offset from said fixed frequency reference signal by less than 0.2 volts to form said composite signal.

24. A method of transmitting data over a transmission link (17) in accordance with claim 22 in which said step of decoding said composite data signal with a phase detector (18, 32) includes applying said composite data signal to an operational amplifier to produce a varying DC output signal driving said frequency conversion circuit (21, 36).

25. A method of transmitting data over a transmission link (17) in accordance with claim 24 in which said step of decoding said composite data signal includes applying said varying DC output from said operational amplifier to a voltage controlled oscillator.

26. A method of transmitting data over a transmission link (17) in accordance with claim 22 in which the step of applying said composite data signal onto a transmission link includes applying said composite data signal onto a twisted pair telephone line cable.

27. A method of transmitting data over a transmission link (17) in accordance with claim 22 in which the step of applying said composite data signal onto a transmission link includes applying said composite data signal onto a twisted pair telephone line.

28. A method of transmitting data over a transmission link in accordance with claim 22 in which the step of encoding data into a modulated data signal superimposed onto a reference signal to produce a composite data signal includes encoding a plurality of modulated data carrying signals onto a plurality of spaced fixed frequency reference signals to produce a plurality of composite data signals and applying said plurality of composite data signals onto a transmission link (17).

29. A data encoding system comprising:
   a source of high frequency data signals;
   an encoder and tone generator (11, 23) having said source of high frequency data signals coupled thereto for producing a composite data signal having a modulated data carrying signal superimposed over a predetermined reference signal by less than 0.2 volt; and
   an output from said encoder and tone generator (11,23) for said composite signal with an amplitude level of less than −32 dbm, whereby an information carrying signal is generated for transmission or storage.

30. A system in accordance with claim 29 including:
   a communication link (17) coupled to said encoder and tone generator (11, 23) to transmit said composite data signal;
   a phase detector circuit (18, 32) coupled to said communication link (17) to receive and decode said composite data signal from said encoder and tone generator (11, 23); and
   a frequency conversion circuit (21, 36) coupled to said phase detector circuit (18, 32) to reproduce said high frequency data signals.

31. A data encoding system in accordance with claim 29 in which said encoder and tone generator circuit (11, 23) produces a composite data signal having a signal level of between −40 and −60 dbm in said output.

32. A data encoding system in accordance with claim 29 in which each said encoder and tone generator (11, 23) produces a composite data signal having said modulated data signal biased from said reference signal by about 0.17 volts.

33. A data transmission system in accordance with claim 30 in which said phase detector circuit (18, 32) includes at least one operational amplifier having a varying DC output driving said frequency conversion circuit (21, 36).

34. A data transmission system in accordance with claim 33 in which said phase detector (18, 32) circuit includes at least one operational amplifier having a varying DC output for driving a voltage controlled oscillator.

35. A data transmission system in accordance with claim 30 in which said phase detector circuit operational amplifier is responsive to a narrow range of preselected audio frequencies to thereby exclude noise and signals outside of said operational amplifier.

36. A data transmission system in accordance with claim 30 in which said communication link (17) includes a twisted pair telephone line.

37. A data transmission system in accordance with claim 30 in which said communication link (17) includes a fiber optic link therein.

38. A data transmission system in accordance with claim 30 in which said communication link (17) includes a satellite communication link.

39. A data transmission system in accordance with claim 30 in which said communication link (17) includes an internationally connected telecommunication network.

40. A data transmission system in accordance with claim 30 in which said communication link (17) includes a plurality of electronic switches therein for directing said transmitted signals therethrough.

41. A data transmission system in accordance with claim 29 having a plurality of encoder and tone generators (11, 23) each having a source of high frequency data signals coupled thereto for producing a plurality of composite data signals, each having a modulated data signal superimposed on a generated fixed frequency reference signal.

42. A process of transmitting video signals over a communication link (17) comprising the steps of:
   generating a composite video signal for transmission to a remote point;

separating said composite video signal into a plurality of component signals;

generating a plurality of separate reference tones, each said reference tone being in an audio range of frequencies;

superimposing each component signal of said separated composite video signal onto one said generated reference tone to form a plurality of composite data signals;

applying each said composite data signal onto a communication link with a signal level of less than −32 dbm;

receiving each said composite data signal at a remote point on said communication link (17);

detecting the phase in each said received composite data signal; and generating each said component video signal of said received composite data signal, whereby video signals are transmitted over a communication link.

43. A process of transmitting a video signal over a communication link (17) in accordance with claim 42 including the step of superimposing each component of said composite video signal onto one said reference tone having a frequency of between −40Hz and 3600 Hz.

44. A process of transmitting a video signal over a communication link (17) in accordance with claim 42 in which the step of separating said composite video signal into a plurality of component signals includes separating said composite video signal into a plurality of individual color signals.

45. A process of transmitting a video signal over a communication link (17) in accordance with claim 42 in which the step of separating said composite video signal into a plurality of component signals includes separating the composite video signal into a plurality of individual color signals and a lumina signal.

46. A process of transmitting a video signal over a communication link (17) in accordance with claim 45 in which the step of separating said composite video signal into a plurality of component signals includes separating the composite video signal into a plurality of individual color signals, a lumina signal and an audio signal.

47. A process of transmitting a video signal over a communication link (17) in accordance with claim 42 in which the step of applying said composite data signal onto a communication link (17) includes applying said composite data signal thereto with an amplitude signal level of between −40 dbm and −60 dbm.

48. A process of transmitting a video signal over a communication link (17) in accordance with claim 42 in which the step of generating each said component signal of said composite video signal from said received composite data signal includes applying the output of each said phase detector to a voltage controlled frequency convertor (36) and generating each said component video signal therefrom.

49. An apparatus for encoding video data for transmission or storage comprising:

a source of video signals;

an encoder circuit (11, 23) coupled to said source of video signals for generating an audio reference tone having a frequency between 40 and 3600 Hz and for converting said video signals to a modulated data signal and superimposing said modulated data signal over said audio reference signal for generating a composite data signal; and an output from said encoder circuit (11, 23) for outputting said composite data signal at an amplitude signal level of less than −32 dbm, whereby an encoded data signal is generated for transmission or storage.

50. An apparatus for decoding a signal in accordance with claim 49 including:

a communication link (17) coupled to said encoder circuit (11, 23) for transmitting said composite signal thereover;

a phase detector circuit (18, 32) located remotely from said encoder circuit (11, 23) and being coupled to said communication link (17) to receive each said composite signal and produce data signals modulated in accordance with said received composite signal modulated by said video signal; and a voltage controlled frequency converter (21, 36), coupled to said phase detector circuit (18, 32) to reproduce said high frequency video signals whereby encoded, stored, or transmitted video signals are decoded.

51. An apparatus in accordance with claim 50 in which said encoder circuit (11, 23) produces a composite data signal having a signal level of less than −32 dbm on said communication link (17).

52. An apparatus for encoding video data in accordance with claim 49 in which said encoder circuit (11, 23) produces a composite data signal having a signal level of between −40 and −60 dbm.

53. An apparatus for encoding video data in accordance with claim 49 in which said encoder (11, 23) produces a composite data signal from said modulated data signal biased from said audio reference signal by less than 0.2 volt.

54. An apparatus for encoding video data in accordance with claim 49 in which said encoder (11, 23) produces a composite data signal from said modulated data signal biased from said reference signal by about 0.17 volt.

55. An apparatus in accordance with claim 50 in which said phase detector circuit (18, 32) includes an operational amplifier having a varying DC output driving said frequency conversion circuit.

56. An apparatus in accordance with claim 50 in which said phase detector circuit (18, 32) is an operational amplifier having a varying DC output driving a voltage controlled oscillator.

57. An apparatus in accordance with claim 55 in which said phase detector circuit (18, 32) operational amplifier is responsive to a narrow range of audio frequencies to thereby exclude noise and signals outside said operational amplifier bandpass.

58. An apparatus in accordance with claim 50 in which said communication link (17) includes a twisted wire telephone cable.

59. An apparatus in accordance with claim 50 in which said communication link (17) includes a satellite communication link therein.

60. An apparatus in accordance with claim 50 in which said communication link (17) includes a an international connected telecommunication network.

61. An apparatus in accordance with claim 50 in which said communication link (17) includes a plurality of electronic switches therein for directing said transmitted signals.

62. An apparatus in accordance with claim 49 having a plurality of encoders (11, 23) each having a source of high frequency data signals coupled thereto for producing a plurality of composite data transmission signals, and each having a modulated data signal superimposed on a generated fixed frequency reference signal.

63. A method of encoding and decoding data for a communication link (17) or for storage comprising the steps of:

generating an audio frequency reference signal below 20,000 Hz;

generating a modulated data signal from a modulated high frequency data signal above 20,000 Hz;

combining said modulated data signal and said audio frequent reference signal to form a composite signal;

outputting said composite signal at a signal level of less than −32 dbm; and decoding said outputted composite signal to reproduce said modulated high frequency data signal above 20,000 Hz, whereby data is encoded for storage or transmission and is decoded to reproduce the encoded data.

* * * * *